United States Patent
Abotabl et al.

(10) Patent No.: US 12,457,575 B2
(45) Date of Patent: Oct. 28, 2025

(54) COEXISTENCE BETWEEN DOWNLINK (DL) POSITIONING REFERENCE SIGNAL (PRS) AND UPLINK (UL) TRANSMISSION IN A FULL DUPLEX USER EQUIPMENT (UE)

(71) Applicant: QUALCOMM Incorporated, San Diego, CA (US)

(72) Inventors: Ahmed Attia Abotabl, San Diego, CA (US); Alexandros Manolakos, Escondido, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/025,425

(22) Filed: Sep. 18, 2020

(65) Prior Publication Data
US 2021/0360575 A1 Nov. 18, 2021

(30) Foreign Application Priority Data
May 13, 2020 (GR) .............................. 20200100250

(51) Int. Cl.
*H04W 64/00* (2009.01)
*H04L 1/00* (2006.01)
(Continued)

(52) U.S. Cl.
CPC ......... *H04W 64/003* (2013.01); *H04L 1/0003* (2013.01); *H04L 1/0013* (2013.01);
(Continued)

(58) Field of Classification Search
CPC ............... H04W 64/003; H04W 76/27; H04W 52/367; H04W 72/0446; H04W 72/14;
(Continued)

(56) References Cited

U.S. PATENT DOCUMENTS 6,493,333 B1 * 12/2002 Kim ..................... H04W 52/325
455/437
10,110,364 B2 10/2018 Kim et al.
(Continued)

FOREIGN PATENT DOCUMENTS

CN 106063178 A 10/2016

OTHER PUBLICATIONS

Ericsson, Different TDD configurations for OTDOA in CA Release 12, 3GPP TSG RAN WG4 Meeting #74bis, Rio de Janeiro, Brazil, Apr. 20-24, 2014, R4-15335 (Year: 2014).*
(Continued)

*Primary Examiner* — Joseph A Bednash
(74) *Attorney, Agent, or Firm* — QUALCOMM Incorporated

(57) ABSTRACT

A method of wireless communications by a user equipment (UE) determines whether a downlink positioning reference signal (PRS) overlaps in time with an uplink transmission within a full duplex slot. The method adjusts the uplink transmission to address the overlap. The adjusting can use an uplink grant to achieve a gap between the PRS and the uplink transmission. The adjusting can puncture a number of resource elements assigned for the uplink transmission. The resource elements are positioned adjacent to the PRS. The adjusting can reduce transmit power. The method can include receiving a priority order for the PRS and multiple uplink transmission types. In this case, the adjusting comprises dropping the uplink transmission in accordance with the priority order.

6 Claims, 14 Drawing Sheets

(51) Int. Cl.
  *H04L 5/00* (2006.01)
  *H04L 5/14* (2006.01)
  *H04W 52/36* (2009.01)
  *H04W 72/0446* (2023.01)
  *H04W 72/23* (2023.01)
  *H04W 76/27* (2018.01)

(52) U.S. Cl.
  CPC .............. *H04L 5/0048* (2013.01); *H04L 5/14* (2013.01); *H04W 52/367* (2013.01); *H04W 72/0446* (2013.01); *H04W 72/23* (2023.01); *H04W 76/27* (2018.02)

(58) Field of Classification Search
  CPC ................. H04L 1/0003; H04L 1/0013; H04L 5/0048; H04L 5/14
  See application file for complete search history.

(56) References Cited

U.S. PATENT DOCUMENTS

| | | | | |
|---|---|---|---|---|
| 2013/0279399 | A1* | 10/2013 | Wilhelmsson | H04B 15/00 370/315 |
| 2016/0065350 | A1* | 3/2016 | Suzuki | H04L 5/0057 370/329 |
| 2016/0080963 | A1 | 3/2016 | Marinier et al. | |
| 2016/0323830 | A1* | 11/2016 | Kim | H04B 1/525 |
| 2016/0330011 | A1* | 11/2016 | Lee | H04L 5/14 |
| 2019/0089502 | A1* | 3/2019 | Yi | H04W 16/14 |
| 2020/0083997 | A1* | 3/2020 | Takata | H04L 5/0062 |
| 2020/0154415 | A1* | 5/2020 | Oh | H04W 74/0808 |

OTHER PUBLICATIONS

3GPP TS 38.211 V16.1.0 (Mar. 2020) 3rd Generation Partnership Project; Technical Specification Group Radio Access Network; NR; Physical channels and modulation (Release 16) (Year: 2020).*
Ericsson: "Different TDD Configurations for OTDOA in CA in Release 12", 3GPP Draft, 3GPP TSG RAN WG4 Meeting #74bis, R4-151335, 3rd Generation Partnership Project (3GPP), Rio de Janeiro, Brazil, Apr. 20-Apr. 24, 2014, XP050938612, 4 Pages, Retrieved from the Internet: URL: http://www.3gpp.org/ftp/Meetings_3GPP_SYNC/RAN4/Docs/. [retrieved on Apr. 18, 2015].
International Search Report and Written Opinion—PCT/US2021/027360—ISA/EPO—Jun. 29, 2021.
Nokia Networks, et al., "Collision Handling for NB-IoT", 3GPP Draft, 3GPP TSG-RAN WG1 NB-IoT Ad-Hoc Meeting, R1-161874, 3rd Generation Partnership Project (3GPP), Sophia Antipolis, France, Mar. 22-Mar. 24, 2016, XP051080991, 2 Pages, Retrieved from the Internet: URL: http://www.3gpp.org/ftp/tsg_ran/WG1_RL1/TSGR1_AH/LTE_NB-IOT_1603/Docs/. [retrieved on Mar. 16, 2016].
Dahlman E., et al., "5G NR The Next Generation Wireless Access Technology", Academic Press, Second Edition, 611 Pages, 2020.

* cited by examiner

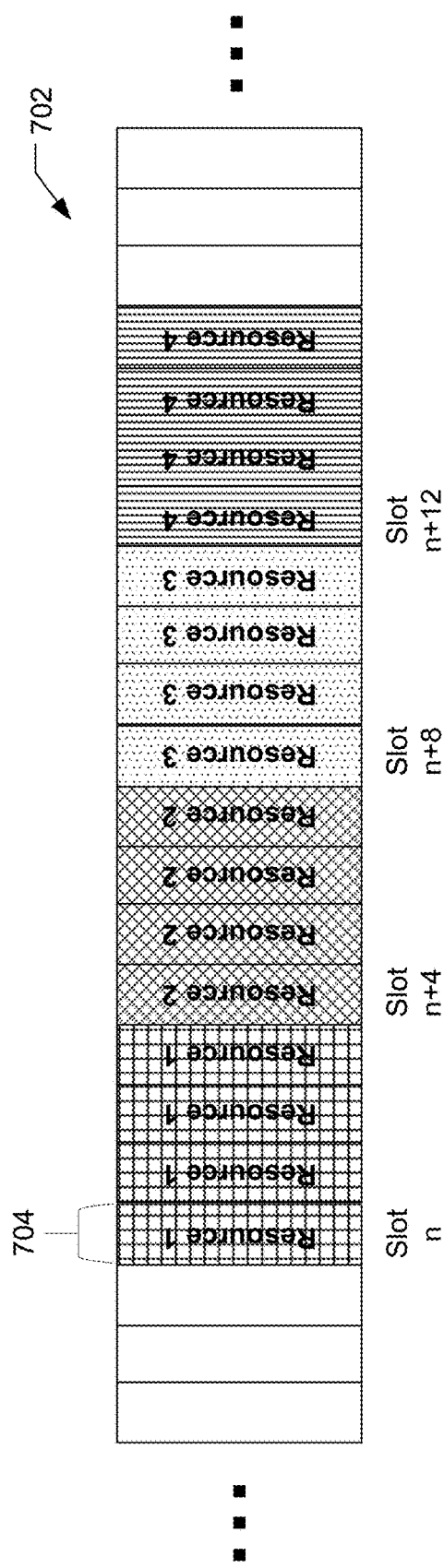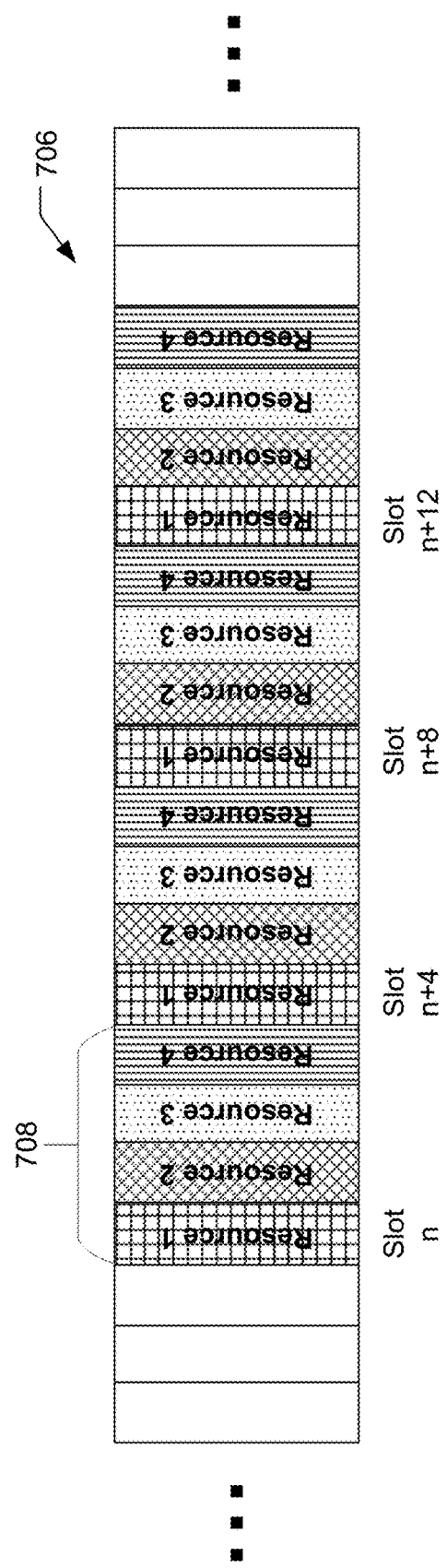
FIG. 7A
FIG. 7B

COEXISTENCE BETWEEN DOWNLINK (DL) POSITIONING REFERENCE SIGNAL (PRS) AND UPLINK (UL) TRANSMISSION IN A FULL DUPLEX USER EQUIPMENT (UE)

CROSS-REFERENCE TO RELATED APPLICATION

The present application claims priority to Greece Patent Application No. 20200100250, filed on May 13, 2020, and titled "COEXISTENCE BETWEEN DOWNLINK (DL) POSITIONING REFERENCE SIGNAL (PRS) AND UPLINK (UL) TRANSMISSION IN A FULL DUPLEX USER EQUIPMENT (UE)," the disclosure of which is expressly incorporated by reference in its entirety.

FIELD OF THE DISCLOSURE

Aspects of the present disclosure generally relate to wireless communications, and more particularly to techniques and apparatuses for communications having a simultaneous downlink (DL) positioning reference signal (PRS) and uplink (UL) transmission in a full duplex user equipment (UE).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

Obtaining a location or position of a mobile device accessing a wireless communications system may be useful for many applications including, for example, emergency calls, personal navigation, asset tracking, locating a friend or family member, etc. Existing positioning methods are based on measuring radio signals transmitted from a variety of devices, such as satellite vehicles (SVs) and terrestrial radio sources, in a wireless network. In methods based on terrestrial radio sources, a mobile device may measure the timing of signals received from two or more base stations and determine times of arrival, time differences of arrival, and/or receive time-transmit time differences. Combining these measurements with known locations for the base stations and known transmission times from each base station may enable position location of the mobile device using such methods as observed time difference of arrival (OTDOA) or enhanced cell ID (ECID).

To further help location determination (e.g., for OTDOA), positioning reference signals (PRSs) may be transmitted by base stations to increase both measurement accuracy and the number of different base stations for which timing measurements can be obtained by a mobile device. The base stations and mobile devices may communicate using half duplex operation, which sequentially utilizes either downlink channels (e.g., for transmissions from a base station to a mobile device) or uplink channels (e.g., for transmissions from a mobile device to a base station). Emerging technologies, however, will enable full duplex operations, in which a base station or mobile device may communicate on downlink and uplink channels simultaneously. Uplink transmissions at the mobile device may lead to self-interference impacting measurement of a downlink PRS. Additionally, if the uplink transmission power is high, as in the case of a mobile device at a cell edge, downlink PRS measurements may be significantly impacted. Thus, full duplex operations may diminish the efficiency of terrestrial positioning processes.

SUMMARY

According to an aspect of the present disclosure, a method of wireless communications by a user equipment (UE) is presented. The method includes determining whether a downlink positioning reference signal (PRS) overlaps in time with a future uplink transmission within a full duplex slot. The method also includes adjusting the uplink transmission to address the overlap.

According to another aspect of the present disclosure, a UE for wireless communications includes a processor and a memory coupled with the processor. Instructions stored in the memory are operable, when executed by the processor, to cause the UE to determine whether a downlink positioning reference signal (PRS) overlaps in time with a future uplink transmission within a full duplex slot. The instructions also cause the UE to adjust the uplink transmission to address the overlap.

According to further aspect of the present disclosure, a UE for wireless communications includes means for determining whether a downlink positioning reference signal (PRS) overlaps in time with a future uplink transmission within a full duplex slot. The UE also includes means for adjusting the uplink transmission to address the overlap.

According to another aspect of the present disclosure, a non-transitory computer readable medium storing program code for wireless communications by a user equipment (UE) includes program code to determine whether a downlink positioning reference signal (PRS) overlaps in time with a future uplink transmission within a full duplex slot. The UE also includes program code to adjust the uplink transmission to address the overlap.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 7A and 7B are block diagrams illustrating example downlink positioning reference signal resource sets.

DETAILED DESCRIPTION

Figure 1:
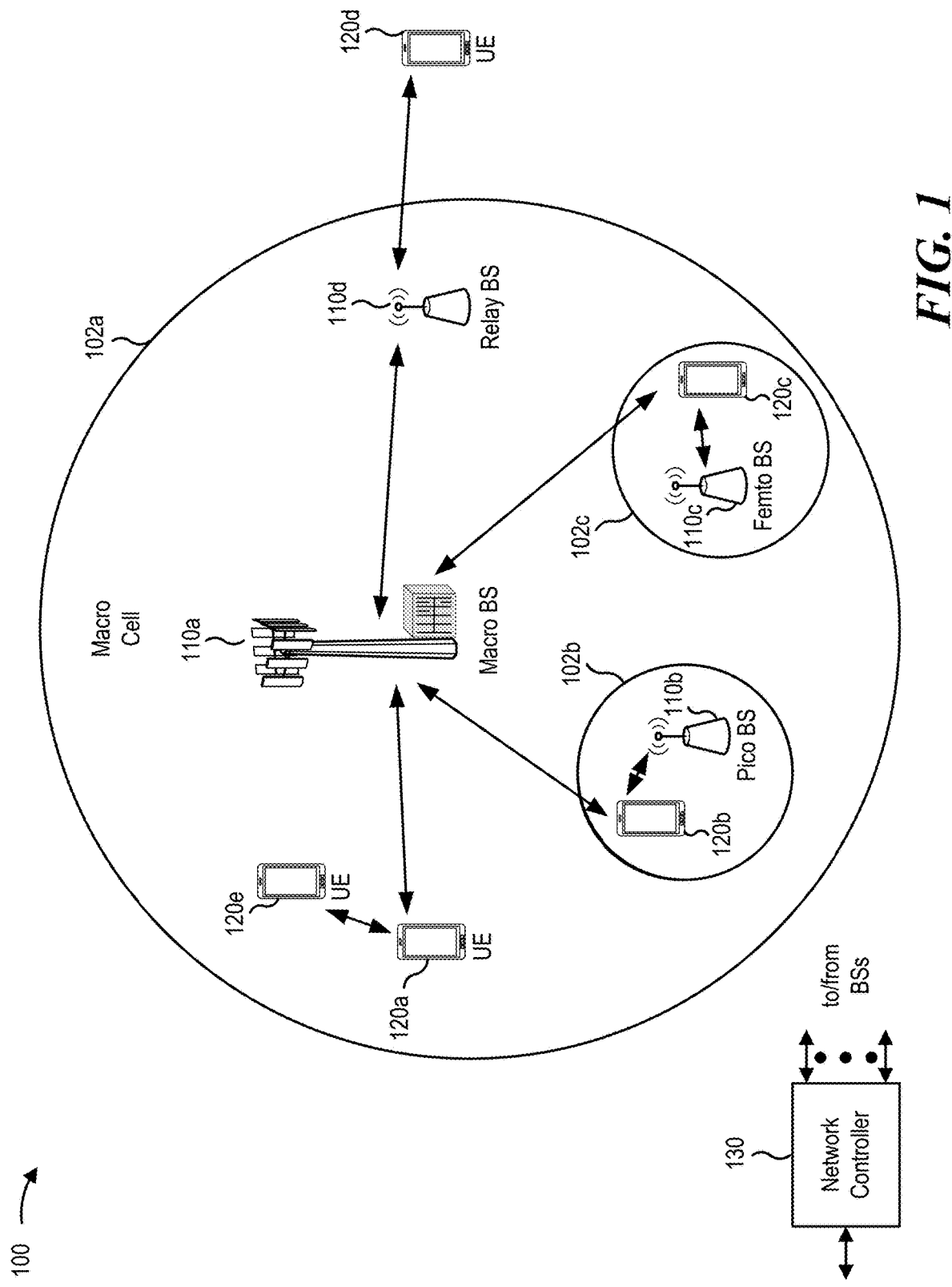
FIG. 1 is a block diagram conceptually illustrating an example of a wireless communications network, in accordance with various aspects of the present disclosure.

Techniques are discussed for utilizing positioning reference signals (PRSs) in full duplex scenarios. A 5G NR deployment may include frames with slots configured for full duplex mode operation. In a full duplex communication mode, antenna systems may have some elements configured to transmit while other elements are configured to receive. The signal-to-noise ratio of a station or mobile device operating in full duplex mode may be degraded due to self-interference (e.g., transmitter leakage). PRS transmissions may occur during a slot configured for full duplex operations. The accuracy of a position estimate based on PRS transmissions in full duplex slots may be reduced, for example, due to self-interference on the mobile device.

According to aspects of the present disclosure, if a PRS overlaps in time with any uplink transmission in a full duplex slot, the mobile device may decide how to address the overlap. In a first option, the mobile device adjusts the uplink grant such that a minimum gap between the PRS and the uplink transmission is maintained. In a second option, the mobile device punctures some of the resource elements (REs) assigned for the uplink transmission that is adjacent to the PRS. In a third option, the mobile device reduces the transmission power to enhance the measurement of the PRS. In still another option, the mobile device is configured with a priority order that includes the PRS and all the possible uplink transmission types. In cases where the PRS overlaps in time with an uplink transmission, the mobile device may drop the uplink transmission depending on the priority order between the uplink transmission and the PRS.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, including 3G and/or 4G technologies.

FIG. 1 is a diagram illustrating a network 100 in which aspects of the present disclosure may be practiced. The network 100 may be a 5G or NR network or some other wireless network, such as an LTE network. The wireless network 100 may include a number of base stations 110 (shown as BS 110a, BS 110b, BS 110c, and BS 110d) and other network entities. A base station is an entity that communicates with user equipment (UEs) and may also be referred to as a base station, a NR base station, a Node B, a gNB, a 5G node B (NB), an access point, a transmit and receive point (TRP), and/or the like. Each base station may provide communications coverage for a particular geographic area. In 3GPP, the term "cell" can refer to a coverage area of a base station and/or a base station subsystem serving this coverage area, depending on the context in which the term is used.

A base station may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay station 110d may communicate with macro base station 110a and a UE 120d in order to facilitate communications between the base station 110a and UE 120d. A relay station may also be referred to as a relay base station, a relay, and/or the like.

The wireless network 100 may be a heterogeneous network that includes base stations of different types, e.g., macro base stations, pico base stations, femto base stations, relay base stations, and/or the like. These different types of base stations may have different transmit power levels, different coverage areas, and different impact on interference in the wireless network 100. For example, macro base stations may have a high transmit power level (e.g., 5 to 40 Watts) whereas pico base stations, femto base stations, and relay base stations may have lower transmit power levels (e.g., 0.1 to 2 Watts).

A network controller 130 may couple to a set of base stations and may provide coordination and control for these base stations. The network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
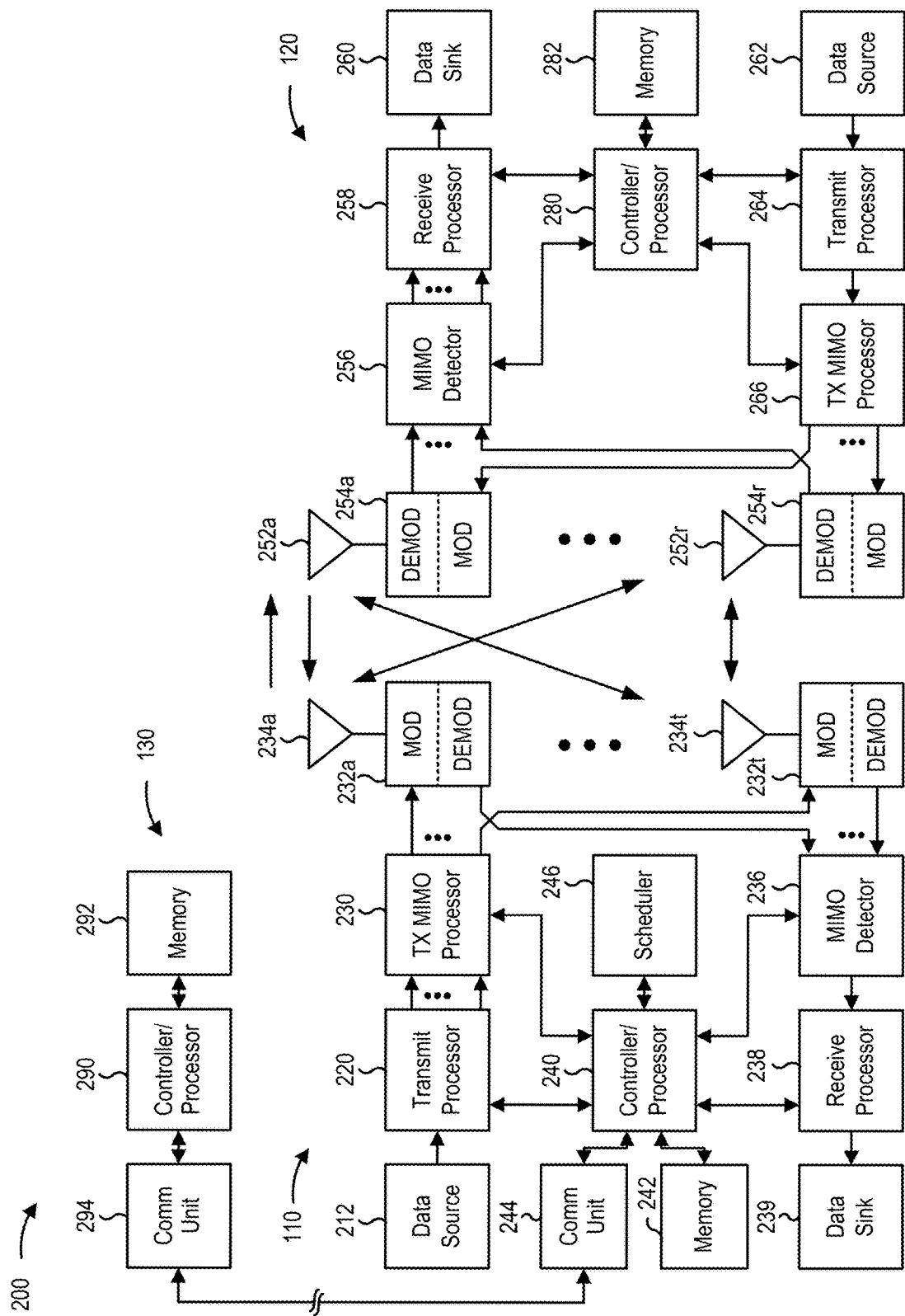
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), cyclic prefix (CP)-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. A scheduler 246 may schedule UEs for data transmission on the downlink and/or uplink. The base station 110 may include communications unit 244 and communicate to the network controller 130 via the communications unit 244. The network controller 130 may include a communications unit 294, a controller/processor 290, and a memory 292.

The controller/processor 280 of the UE 120, and/or any other component(s) of FIG. 2 may perform one or more techniques associated with enabling PRS and uplink transmission coexistence, as described in more detail elsewhere. For example, the controller/processor 280 of the UE 120, and/or any other component(s) of FIG. 2 may perform or direct operations of, for example, the processes of FIG. 11 and/or other processes as described. Memory 282 may store data and program codes for the UE 120.

In some aspects, the UE 120 may include means for determining, means for adjusting, means for receiving, means for maintaining, means for increasing, means for puncturing, means for reducing, means for decreasing, means for dropping, and/or means for skipping. Such means may include one or more components of the UE 120 described in connection with FIG. 2.

As indicated above, FIG. 2 is provided merely as an example. Other examples may differ from what is described with regard to FIG. 2.

Figure 3A:
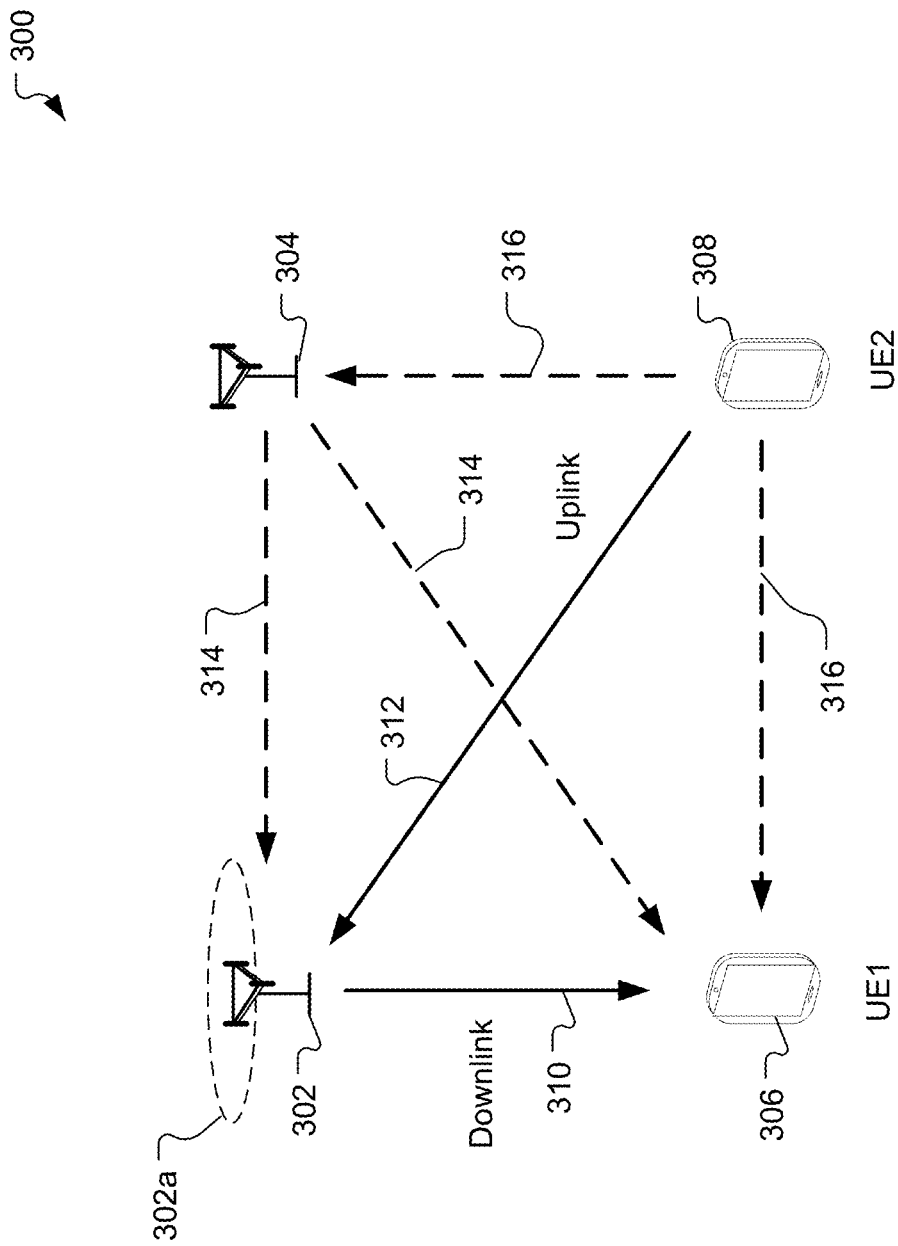
FIGS. 3A-3C are block diagrams illustrating different full duplex communication modes in a telecommunications system.
Figure 3B:
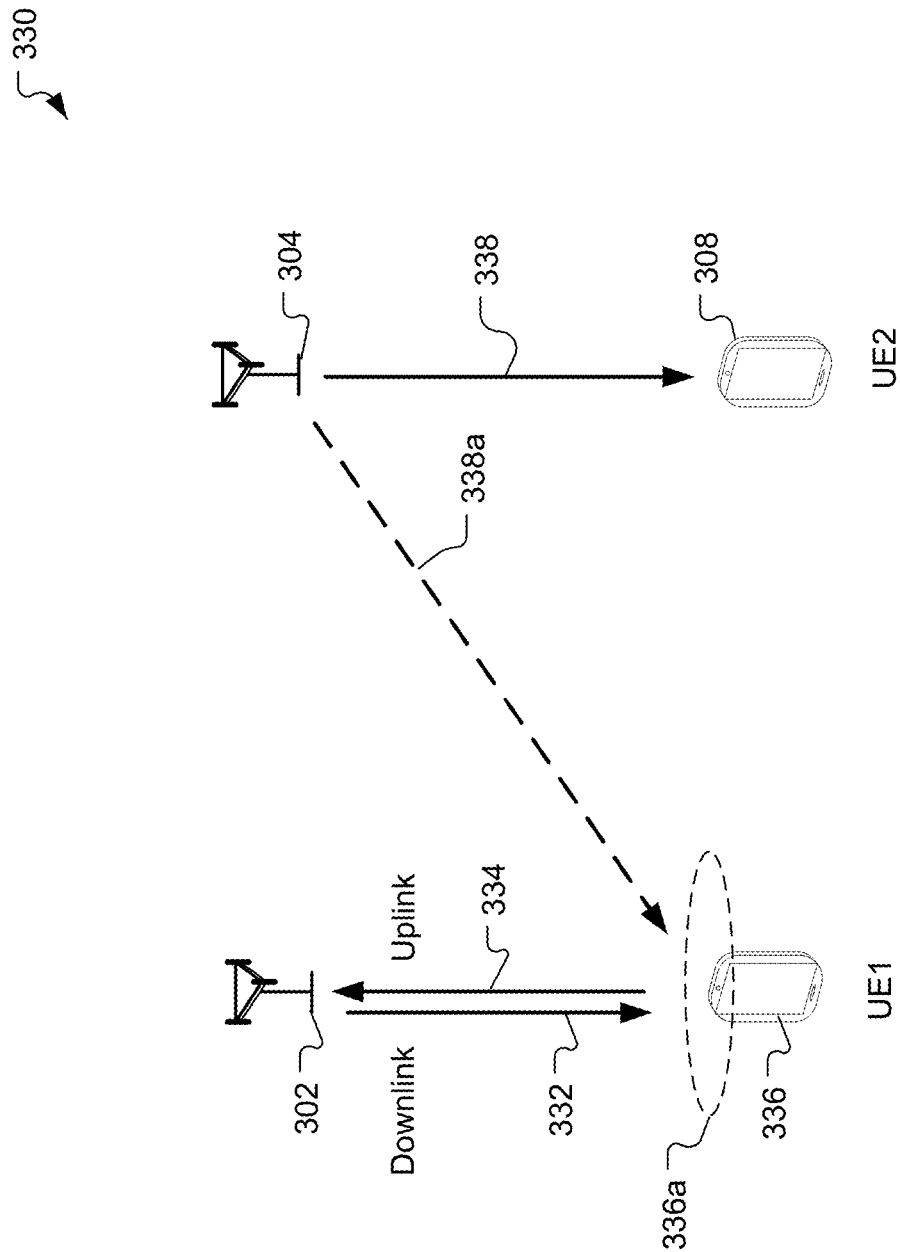
Figure 3C:
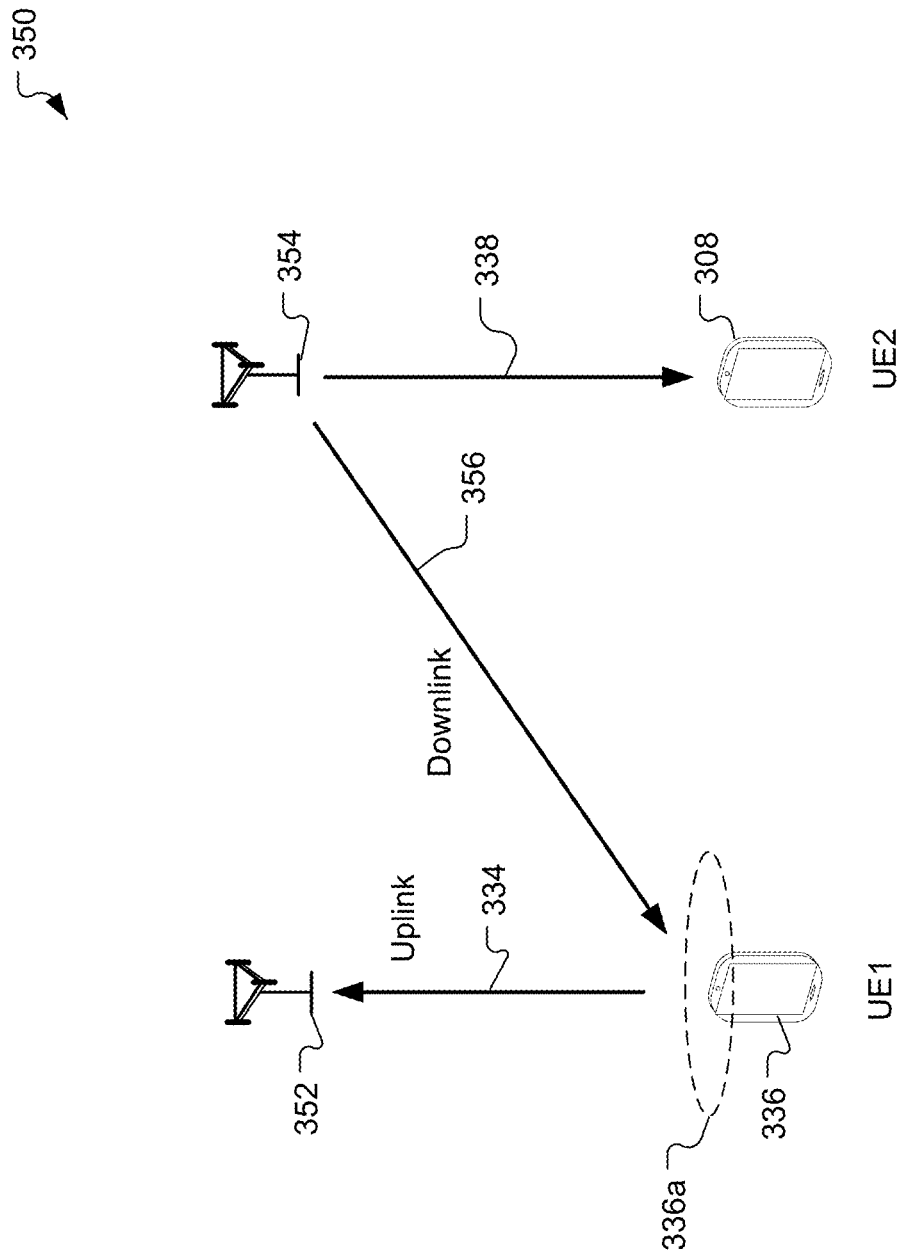

FIGS. 3A-3C illustrate different full duplex communication modes in a telecommunications system. Referring to FIG. 3A, with further reference to FIGS. 1 and 2, an illustration 300 of full duplex communication mode with a full duplex (FD) base station and a half duplex (HD) UE is shown. The illustration includes a FD base station 302, a HD base station 304, a first HD UE 306, and a second HD UE 308. The FD base station 302 can communicate simultaneously in the uplink (UL) and downlink (DL) with the two HD UEs 306, 308 using the same radio resources. For example, the FD base station 302 may communicate with the first HD UE 306 via a downlink 310 and with the second HD UE 308 via an uplink 312. The FD base station 302 may be susceptible to self-interference 302a from its downlink to uplink operation, as well as interference 314 from other gNBs such as the HD base station 304. The first HD UE 306 may be susceptible to interference 314 from the HD base station 304 and interference 316 from the second HD UE 308. In general, the self-interference 302a (or transmitter leakage) refers to the signal that leaks from the device transmitter to its own receiver.

Referring to FIG. 3B, an illustration 330 of another full duplex communication mode with a full duplex base station and a full duplex UE is shown. The illustration 330 includes the FD base station 302, the HD base station 304, a FD UE 336, and the HD UE 308. The FD base station 302 and the FD UE 336 are configured to communicate simultaneously via an UL 334 and a DL 332 using the same radio resources. The HD base station 304 is communicating with the HD UE 308 via a DL 338. While communicating, the FD UE 336 may be susceptible to self-interference 336a, and interference 338a from other gNB(s) such as the HD base station 304. The FD UE 336 may also be susceptible to interference transmitting from the HD UE 308.

FIG. 3C shows an illustration 350 of another full duplex communication mode with a full duplex UE. The illustration 350 includes a first HD base station 352, a second HD base station 354, the FD UE 336 and the HD UE 308. The FD UE 336 is configured to communicate simultaneously in the UL and DL with multiple transmission-reception points (e.g., multiple base stations) using the same radio resources. For example, the FD UE 336 may simultaneously communicate with the first HD base station 352 via the UL 334, and with the second HD base station 354 via a DL 356. The FD UE 336 may be susceptible to self-interference 336a from UL to DL operation. In an example, both UE1 336 and UE2 308 may be configured as FD UEs and capable of full duplex communications via device-to-device (D2D) sidelinks (e.g., PC5).

Figure 4A:
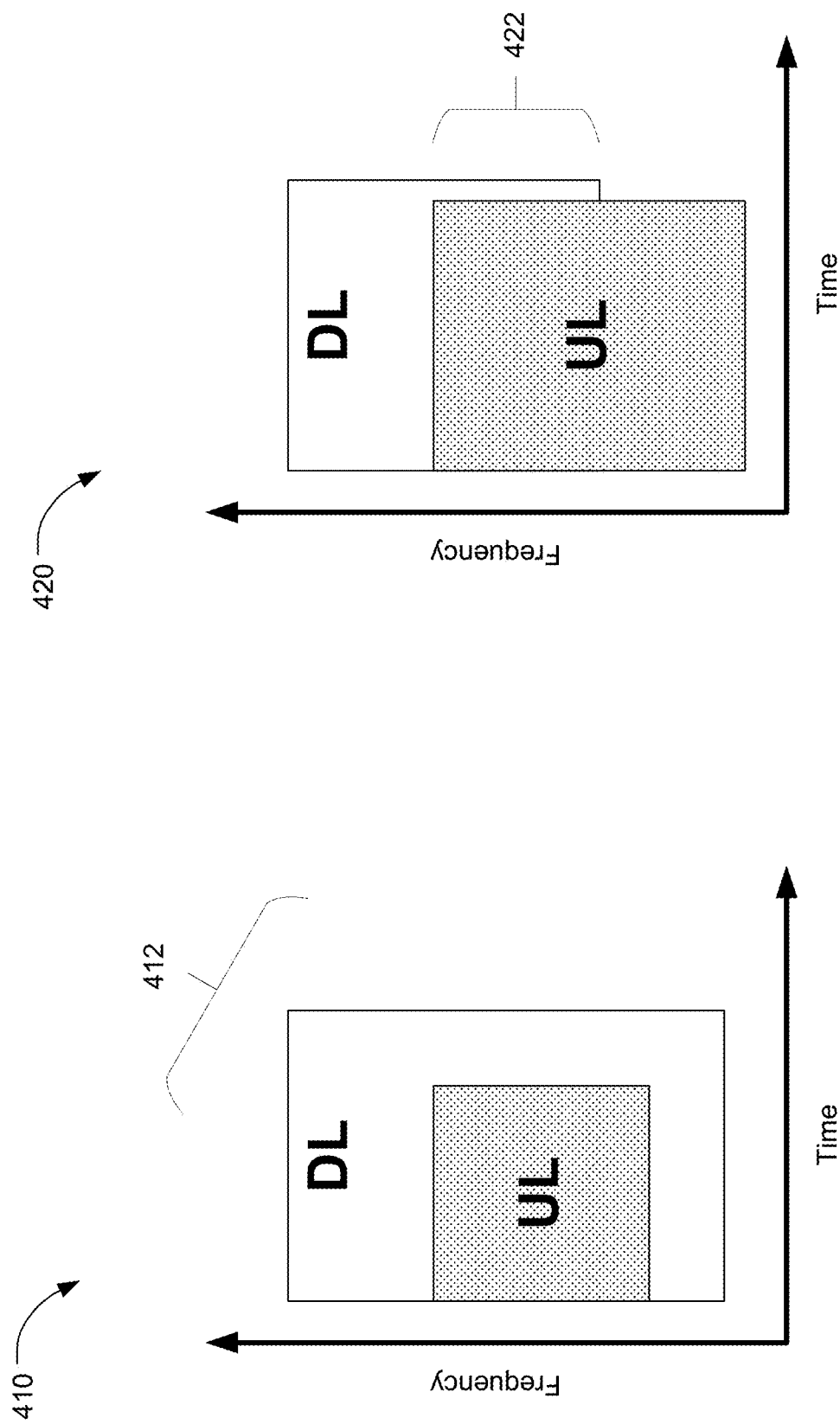
FIGS. 4A and 4B are graphs showing examples of different types of full duplex operation.

In addition to supporting various FD communication modes (also referred to as deployments), the wireless communication system may support various types of FD operation. In-band full duplex (IBFD), for example, is one type of FD operation in which devices can transmit and receive at the same time and on the same frequency resources. FIG. 4A shows example diagrams 410 and 420 of different types of full duplex operation. As shown in a first diagram 410 of FIG. 4A, in one aspect, the DL and UL may fully share the same IBFD time/frequency resource 412 (e.g., there may be a full overlap of the DL and UL allocations within the IBFD time/frequency resource). As shown in a second diagram 420 of FIG. 4A, in one aspect, the DL and UL may partially share the same IBFD time/frequency resource 422 (e.g., there may be a partial overlap of the DL and UL allocations within the IBFD time/frequency resource).

Figure 4B:
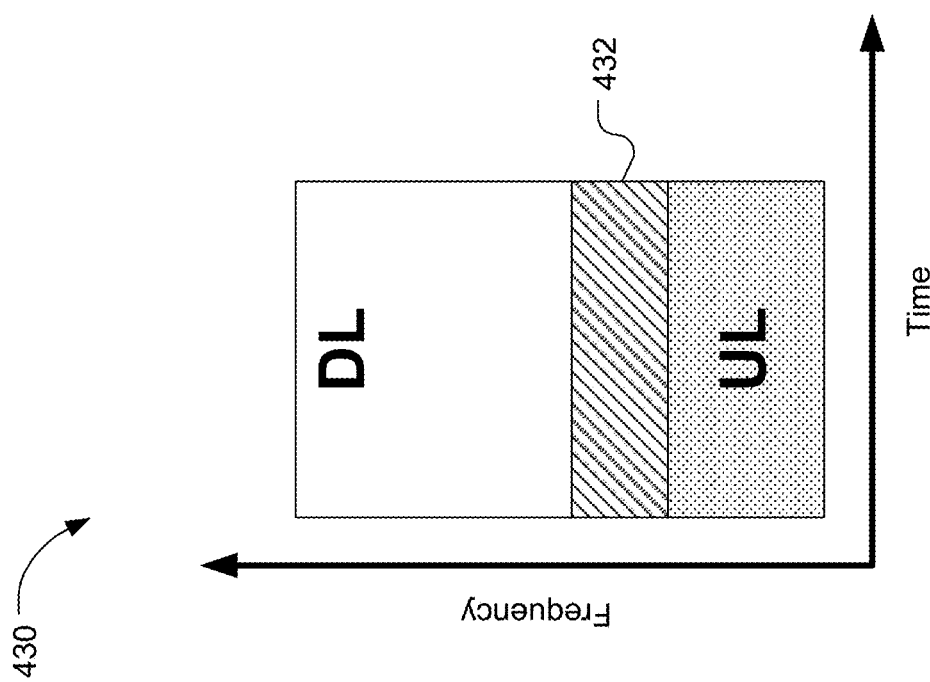

Sub-band FD (also referred to as flexible duplex) is another type of FD operation in which devices can transmit and receive at the same time but on different frequency resources. FIG. 4B shows an example diagram 430 of a different type of full duplex operation. Referring to the diagram 430 in FIG. 4B, the DL resources may be separated from the UL resources in the frequency domain by a guard band 432. This mode of operations reduces the self-interference cancellation requirements on the FD device because the leakage is lower. Guard bands (e.g., 432), however, can be very small. Therefore, interference may still occur.

Figure 5:
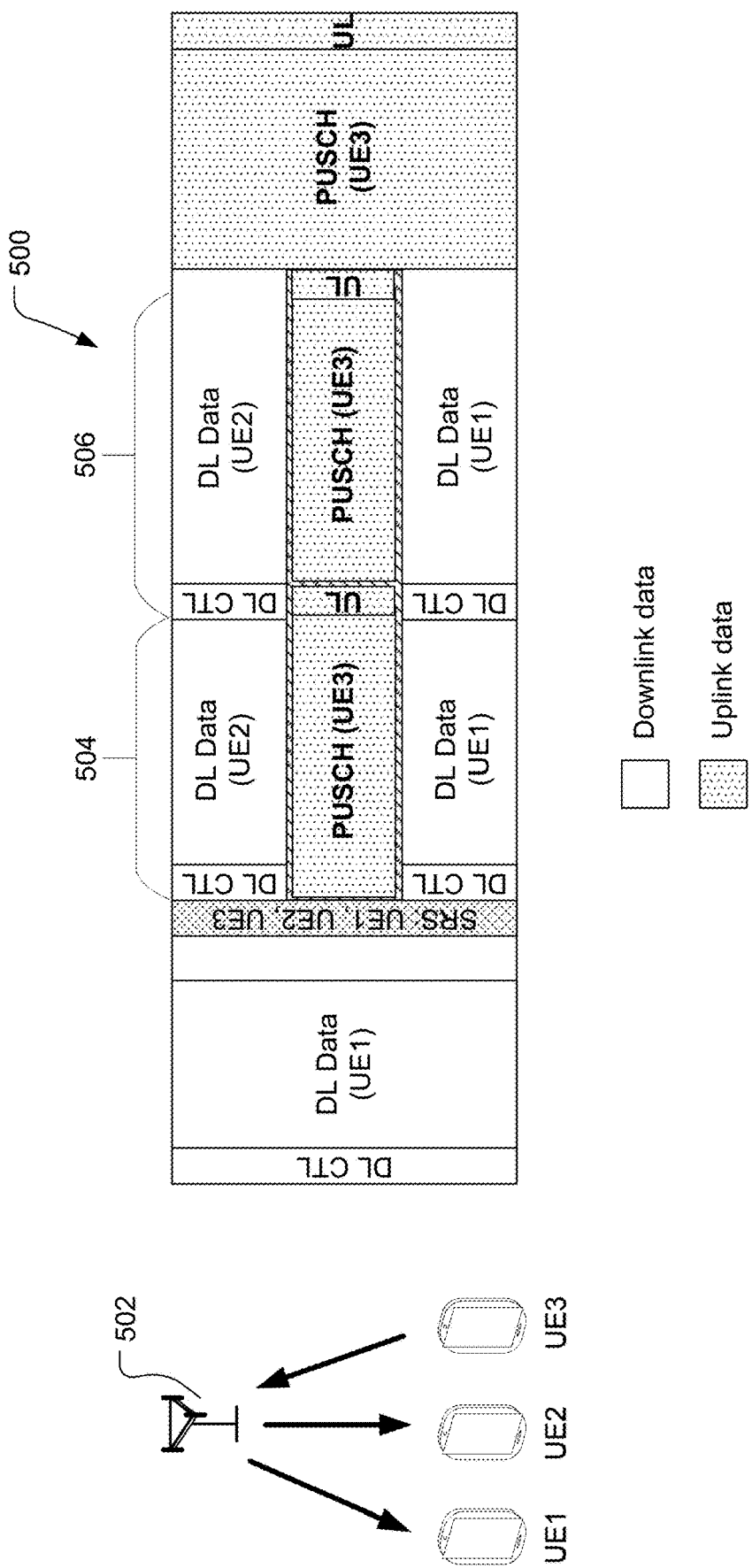
FIG. 5 is a block diagram illustrating an example spectrum for a full duplex base station and half duplex mobile devices.

FIG. 5 illustrates an example spectrum 500 for a full duplex base station and half duplex mobile devices. Referring to FIG. 5, with further reference to FIGS. 1-4B, the example spectrum 500 for a full duplex base station 502 and half duplex mobile devices (e.g., UE1, UE2, and UE3) is shown. In some aspects, there may be flexible DL/UL operation in time (across and within slots) and across multiple UEs. FIG. 5 illustrates an example use of time/frequency resources for a FD base station 502 (e.g., a gNB) and multiple HD UEs (e.g., UE1, UE2, and UE3). As shown in the spectrum 500, there may be simultaneous physical downlink shared channel (PDSCH) and physical uplink shared channel (PUSCH) grants for the same subframe/slot (for different UEs). For example, in slots 504 and 506, the FD base station 502 resources may be split between receiving data from UE1 and UE2 and transmitting data to UE3.

Figure 6:
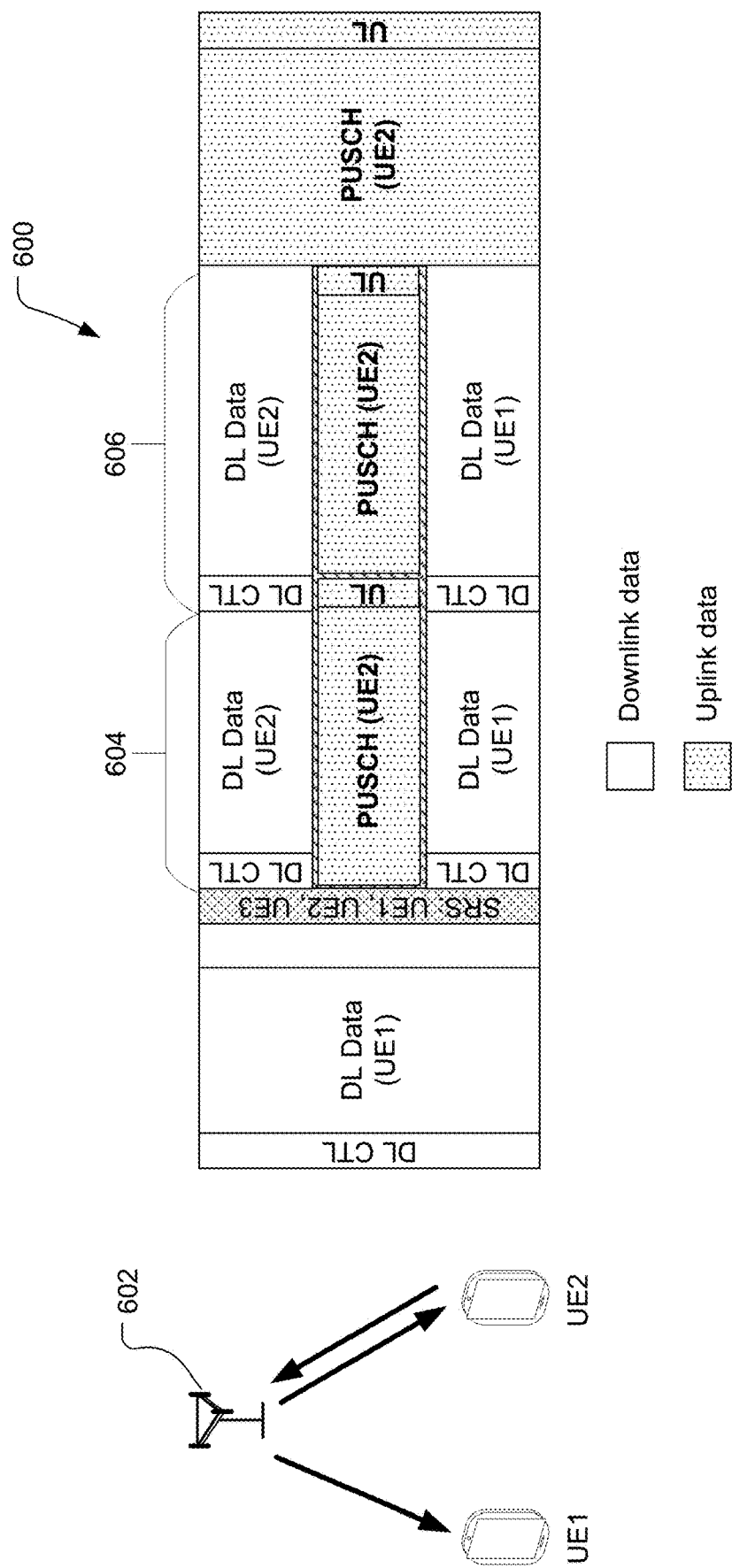
FIG. 6 is a block diagram illustrating an example spectrum for a full duplex base station and full duplex mobile devices.

FIG. 6 illustrates an example spectrum 600 for a full duplex (FD) base station and full duplex mobile devices. Referring to FIG. 6, with further reference to FIGS. 1-5, the example spectrum 600 shows another example use of time/frequency resources for a full duplex base station 602 and full duplex mobile devices (e.g., UE1 and UE2) is shown. As shown in the spectrum 600, compared to spectrum 500 in FIG. 5, there may be simultaneous PDSCH and PUSCH grants for the same subframe/slots for the same UE (e.g., UE2) and/or different UEs. For example, in slots 604 and 606, for a FD UE (e.g., UE2) there may be simultaneous UL and DL transmissions.

FIGS. 7A and 7B illustrate example downlink positioning reference signal resource sets (DL PRSs). In general, a DL PRS resource set is a collection of PRS resources across one base station (e.g., TRP), which have the same periodicity, a common muting pattern configuration, and the same repetition factor across slots. As shown in FIG. 7A, a first DL PRS resource set 702 includes four resources and a repetition factor of four, with a time-gap 704 equal to one slot. As shown in FIG. 7B, a second DL PRS resource set 706 includes four resources and a repetition factor of four with a time-gap 708 equal to four slots. The repetition factor indicates the number of times each PRS resource is repeated in each single instance of the PRS resource set (e.g., values of 1, 2, 4, 6, 8, 16, 32). The time-gap (e.g., 704 or 708) represents the offset in units of slots between two repeated instances of a DL PRS resource corresponding to the same PRS resource ID within a single instance of the DL PRS resource set (e.g., values of 1, 2, 4, 8, 16, 32). The time duration spanned by one DL PRS resource set containing repeated DL PRS resources does not exceed a PRS-periodicity. The repetition of a DL PRS resource enables receiver beam sweeping across repetitions and combining radio frequency (RF) gains to increase coverage. The repetition may also enable intra-instance muting.

A positioning frequency layer is a collection of positioning reference signal (PRS) resource sets across one or more transmission and reception points (TRPs) with the same subcarrier spacing (SCS) and cyclic prefix (CP) type, where all numerologies supported for physical downlink shared channel (PDSCH) are supported for the PRS. The positioning frequency layer has the same point-A (e.g., which takes the values ARFCN-ValueNR), the same value of DL PRS bandwidth (e.g., with a granularity of four physical resource blocks (PRBs) with a minimum of 24 PRBs and a maximum of 272 PRBs), the same start PRB (and center frequency), and the same value of comb-size.

Figure 8:
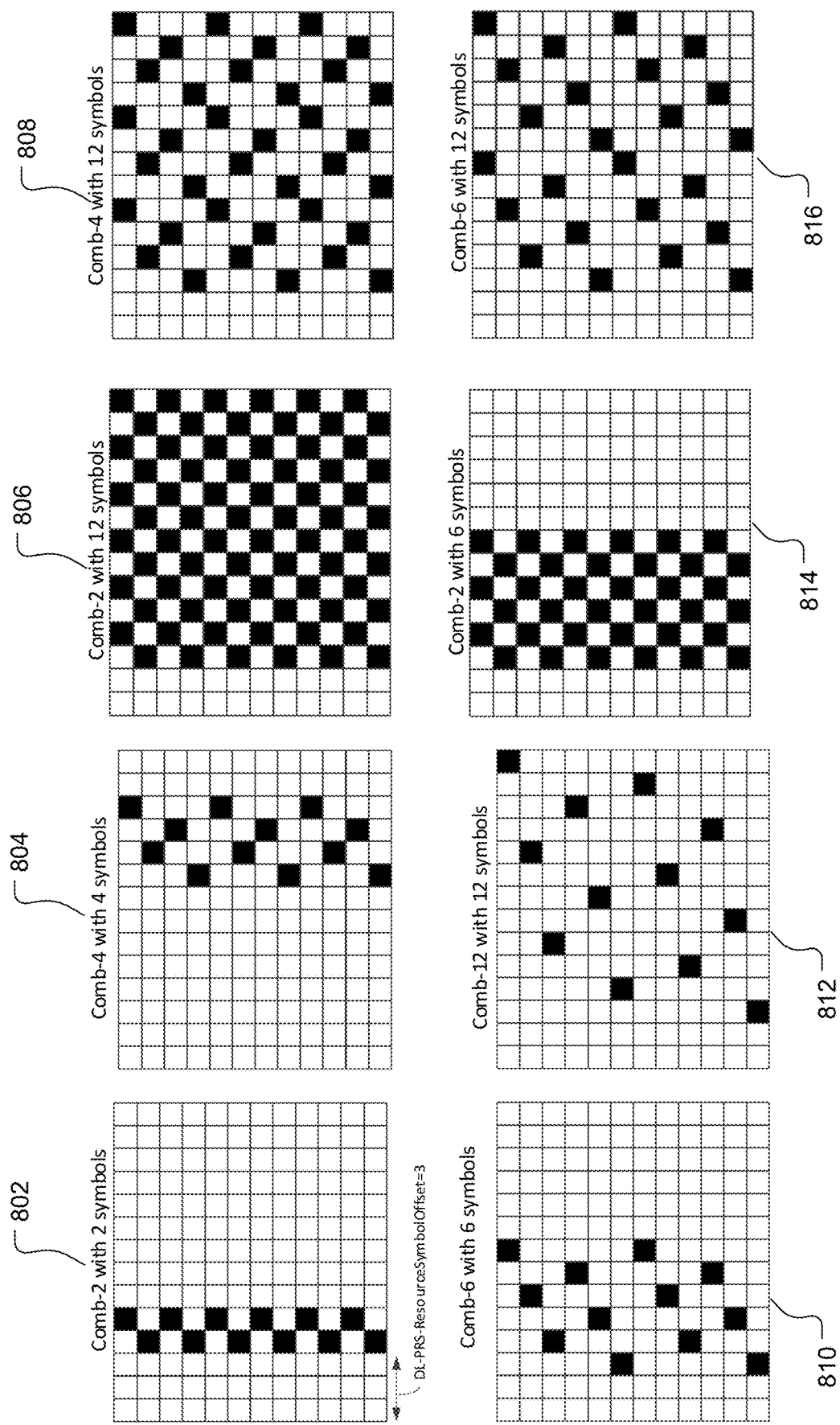
FIG. 8 is a block diagram illustrating example subframe and slot formats for positioning reference signal (PRS) transmission.

FIG. 8 illustrates example subframe and slot formats for positioning reference signal (PRS) transmission. The example subframe and slot formats are included in the DL PRS resource sets 702 and 706 depicted in FIGS. 7A and 7B. The subframes and slot formats in FIG. 8 are examples, not limitations, and include a comb-2 with two symbols format 802, a comb-4 with four symbols format 804, a comb-2 with 12 symbols format 806, a comb-4 with 12 symbols format 808, a comb-6 with six symbols format 810, a comb-12 with 12 symbols format 812, a comb-2 with six symbols format 814, and a comb-6 with 12 symbols format 816. In general, a subframe may include 14 symbol periods with indices 0 to 13. The subframe and slot formats may be used for a physical broadcast channel (PBCH). A base station may transmit the PRS from antenna port six on one or more slots in each subframe configured for PRS transmission. The base station may avoid transmitting the PRS on resource elements allocated to the PBCH, a primary synchronization signal (PSS), or a secondary synchronization signal (SSS) regardless of the antenna ports. The cell may generate reference symbols for the PRS based on a cell ID, a symbol period index, and a slot index. Generally, a UE may be able to distinguish the PRS from different cells.

A base station may transmit the DL PRS over a particular PRS bandwidth, which may be configured by higher layers. The base station may transmit the PRS on subcarriers spaced apart across the PRS bandwidth. The base station may also transmit the PRS based on parameters such as PRS periodicity (TPRS), subframe offset (Delta_PRS), and PRS duration (NPRS). PRS periodicity is the periodicity at which the PRS is transmitted. The PRS periodicity may be, for example, 160, 320, 640, or 1280 ms. Subframe offset indicates specific subframes in which the PRS is transmitted. PRS duration indicates the number of consecutive subframes in which the PRS is transmitted in each period of PRS transmission (PRS occasion). The PRS duration may be, for example, 1, 2, 4, or 6 ms.

The PRS periodicity TPRS and the subframe offset Delta_PRS may be conveyed via a PRS configuration index $I_{PRS}$. The PRS configuration index $I_{PRS}$ and the PRS duration may be configured independently by higher layers. A set of NPRS consecutive subframes in which the PRS is transmitted may be referred to as a PRS occasion. Each PRS occasion may be enabled or muted. For example, the UE may apply a muting bit to each cell. As noted above, a PRS resource set is a collection of PRS resources across a base station that have the same periodicity, a common muting pattern configuration, and the same repetition factor across slots (e.g., 1, 2, 4, 6, 8, 16, 32 slots).

Figure 9:
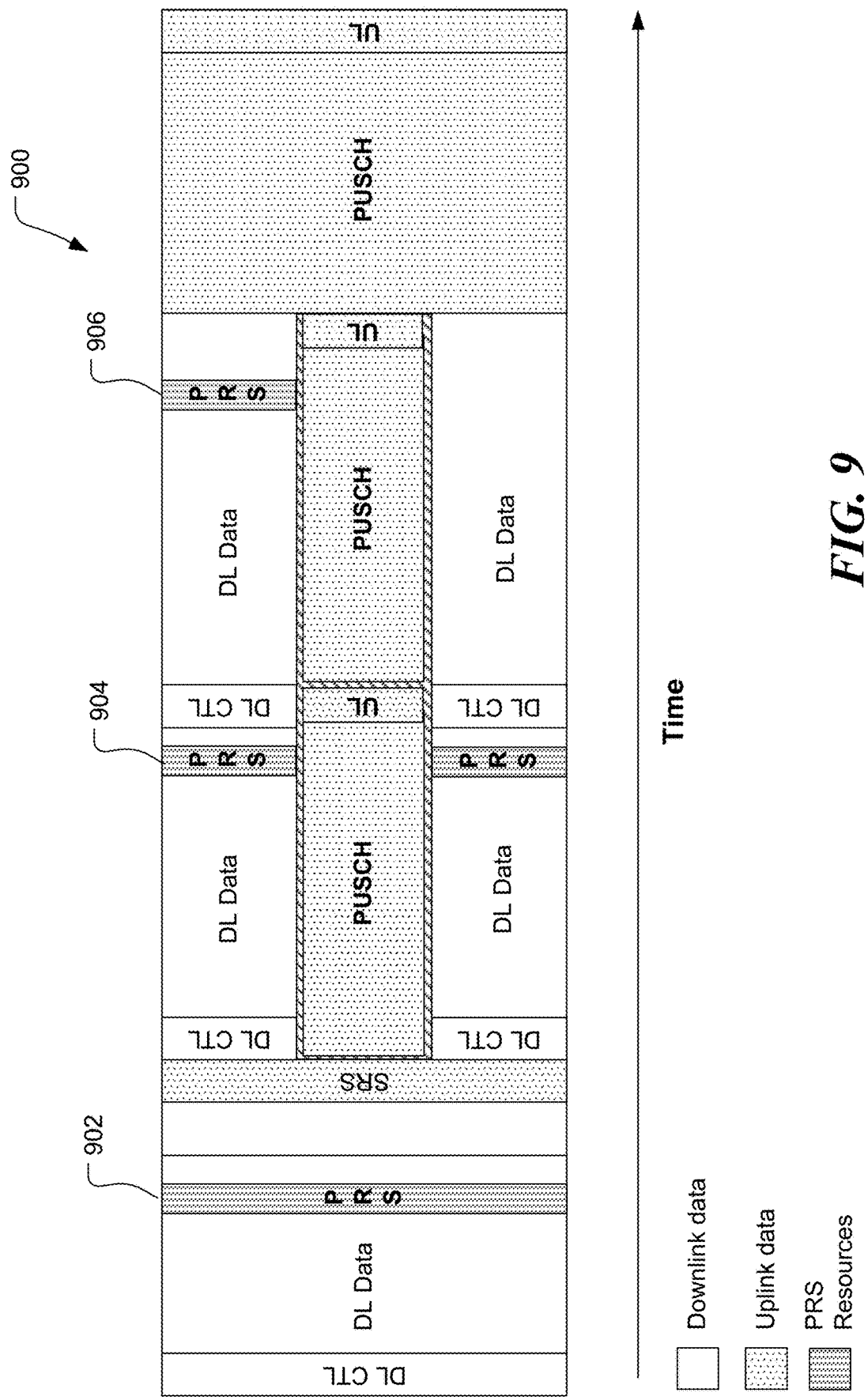
FIG. 9 is a block diagram illustrating an example spectrum for sub-band full duplex positioning reference signal (PRS) transmissions.

FIG. 9 illustrates an example spectrum 900 for sub-band full duplex positioning reference signal (PRS) transmissions. The spectrum 900 is an example use of time/frequency resources of a FD UE, such as the full duplex spectrums 500, 600, with PRS resources added. For example, the spectrum 900 includes a first DL PRS transmission 902, a second DL PRS transmission 904, and a third DL PRS transmission 906. The first DL PRS transmission 902 occurs during a downlink region and does not overlap with the uplink regions (e.g., the PUSCH). The second DL PRS transmission 904 overlaps with the uplink regions. The third DL PRS transmission 906 occurs in a full duplex slot but is not considered overlapped with the uplink region because it only occupies a portion of the DL bandwidth.

In an example, a base station 110 or other resources in the wireless communications network 100 may configure the PRS resources based on whether a slot is in a half duplex (HD) region or a full duplex (FD) region. The positioning frequency layer may be expanded by including a field or other information element (IE) to indicate information of slot class (either HD or FD) in the definition of the positioning frequency layer. The positioning frequency layer may include a collection of PRS resource sets across one or more base stations (e.g., TRPs) with the same kind of HD or FD slots. The network may configure the PRS separately for FD operation and HD operation. For example, one positioning frequency layer may be configured for FD slots, and another positioning frequency layer may be provided for HD slots.

Figure 10:
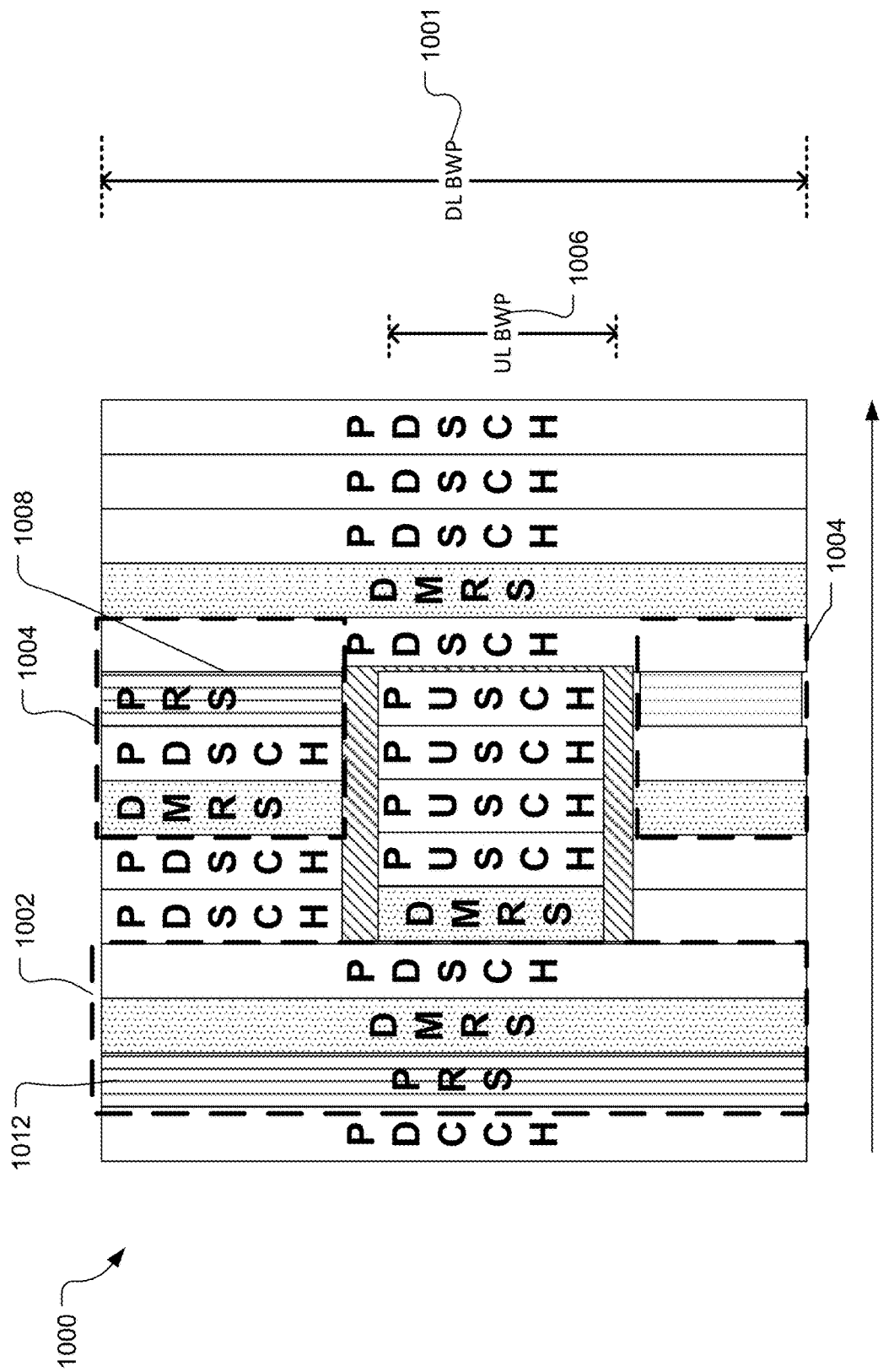
FIG. 10 is a block diagram illustrating an example spectrum for full duplex positioning reference signal (PRS) transmissions.

FIG. 10 illustrates an example spectrum 1000 for full duplex positioning reference signal (PRS) transmissions. In an example, to avoid bandwidth part (BWP) switching delays, the DL PRS transmissions may be configured and processed within indicated resource bandwidths (BWs) within an active BWP. An active DL BWP 1001 may span across an active UL BWP 1006. A first resource BW 1002 and a second resource BW 1004 may be defined within the active DL BWP 1001. The second resource BW 1004 comprises a disjoint set of frequency resources across the DL BWP 1001 (e.g., it is not continuous throughout the DL BWP 1001). The second resource BW 1004 includes frequencies that are outside of the active UL BWP 1006. The resource BWs 1002, 1004 may be configured via radio resource control (RRC) signaling and the indication of the resource BWs may be dynamic (e.g., downlink control information (DCI) based). The first resource BW 1002 includes a first DL PRS transmission 1012, and the second resource BW 1004 includes a second DL PRS transmission 1008.

In an example, the UEs may be configured based on their capabilities as an HD UE or a FD UE. An HD UE may be configured to process the first DL PRS transmission 1012 and to skip the second DL PRS reception/processing (e.g., the PRS in the full duplex region). The performance of a FD UE may vary based on the type of full duplex operation. In an example, FIG. 10 illustrates an example of duplex operation where the active UL BWP 1006 may create a partial overlap between the UL and DL resource BWs. As seen in FIG. 10, a DL PRS transmission may be configured across the entirety of the DL BWP 1001 and thus overlap with the UL BWP 1006. That is, in a full duplex slot, receiving the downlink (DL) PRS can occur simultaneously with an uplink (UL) transmission. There is currently no solution to handle the UL transmission in a way to improve measurement accuracy. Aspects of the present disclosure provide methods to handle the UL transmissions to improve the accuracy of measurements for DL PRS.

As noted previously, UL transmissions at the UE may lead to self-interference, impacting measurements of the DL PRS. The UE can report that the measurement occurred during a full duplex mode, however, because of the self-interference, the measurement accuracy can be highly degraded. Assuming that positioning has some priority over certain UL transmissions, can improve the DL PRS measurement accuracy, as described in more detail below. Finally, if the UL transmission power is very high (for example, for a cell-edge UE), the DL PRS measurement will be highly impacted due to leakage across the guard bands.

According to aspects of the present disclosure, if the DL PRS overlaps in time with any UL transmission in a full duplex slot, the UE may decide how to address the overlap. Examples of uplink transmissions include but are not limited to SRS, PUSCH, physical uplink control channel (PUCCH), and random access channel (RACH) transmissions. In a first option, the UE adjusts the UL grant such that a minimum gap between the DL PRS and the UL transmission is maintained. That is, the guard band is increased. This gap can be radio resource control (RRC) configured. If the UL grant already satisfies the minimum gap, the UE does not modify the UL resources. In one aspect, the UE also increases the transmit (Tx) power and/or the modulation and coding scheme (MCS). The increase can be RRC configured and accounts for the wasted resources, while containing the self-interference. Increasing the MCS increases throughput but decreases reliability of the transmission.

In a second option, the UE punctures some of the resource elements (REs) assigned for the UL transmission that are adjacent to the DL PRS. This option also enlarges the guard band. The number of punctured REs depends on the specified gap between the DL PRS and the UL transmission. The gap size can be RRC configured.

Finally, in a third option, the UE reduces the transmission power to enhance the measurement of the DL PRS. The power is reduced if the transmit power exceeds a maximum configured value. If the transmit power is already less than the maximum configured value, the UE does change the transmit power. In one aspect, the UE may decrease an MCS in conjunction with reducing the transmit power to improve reliability of the transmission. In another aspect, the UE does not adjust the MCS.

According to another aspect of the present disclosure, the UE can decide whether or not to drop the measurement of the DL PRS based on a level of self-interference resulting from the UL transmission. In this aspect, the UE is configured with a certain threshold of measurement quality or self-interference below which the UE is allowed to measure the DL PRS. Otherwise, the UE does not perform any measurements. In one aspect, this threshold can be configured based on a value representing the self-interference power. In another aspect, the threshold can be configured base on a transmit power and a size of the gap between the UL transmission and the DL PRS. The size of the gap can be network configured, for example, by RRC signaling. The threshold value can also be network configured, for example, by RRC signaling.

According to another aspect of the present disclosure, the UE is configured with a priority order that includes the DL PRS and possible UL transmission types. For example, the PRS can have a higher priority than a PUSCH transmission, but a lower priority with respect to a RACH transmission. In cases where the DL PRS overlaps in time with an UL transmission, the UE may drop the UL transmission depending on the priority order between the UL channel/signal and the DL PRS. For example, if the UE is configured with a priority of DL PRS higher than a priority of PUSCH and an overlap occurs, the UE drops the PUSCH transmission. If the UL transmission is not dropped, in one configuration, the UE still measures the PRS. In another configuration, the UE does not measure the PRS. Whether the UE measures the PRS can be configured by the network or can be based on UE implementation.

Aspects of the present disclosure include two techniques for dropping the UL transmission if an UL transmission overlaps with the DL PRS. A first option is for the UE to drop only the symbols that overlap with the PRS. A second option is for the UE to drop the UL symbols starting from a first overlapped symbol to an end of the PUSCH transmission.

As indicated above, FIGS. 3-10 are provided as examples. Other examples may differ from what is described with respect to FIGS. 3-10.

Figure 11:
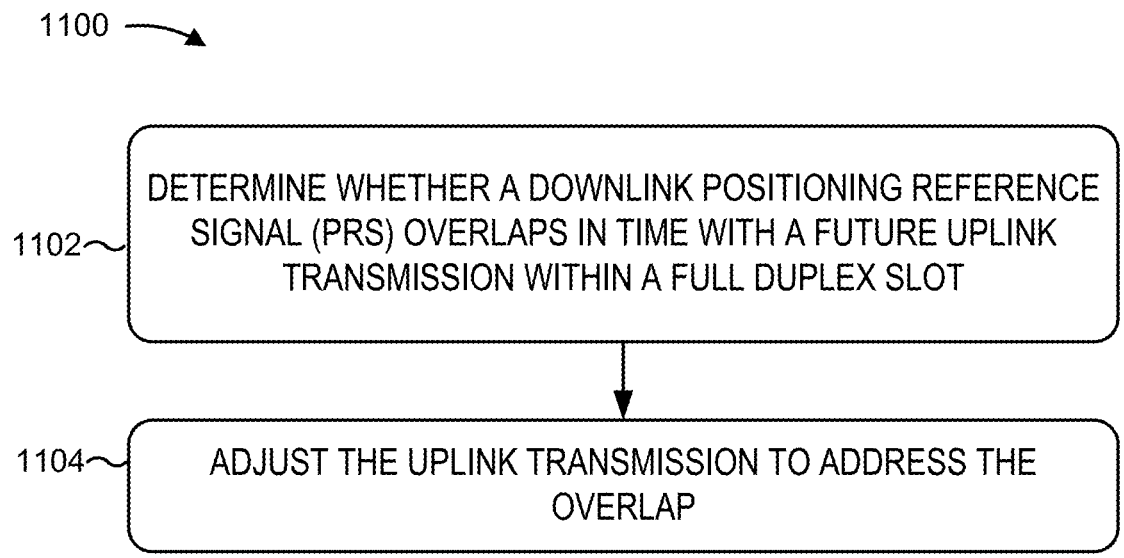
FIG. 11 is a flow diagram illustrating an example process performed, for example, by a user equipment (UE), in accordance with various aspects of the present disclosure.

FIG. 11 is a diagram illustrating an example process 1100 performed, for example, by a UE, in accordance with various aspects of the present disclosure. The example process 1110 is an example of PRS coexisting with uplink transmissions. In some aspects, the process 1100 may include determining whether a downlink positioning reference signal (PRS) overlaps in time with a future uplink transmission within a full duplex slot (block 1102). For example, the UE (e.g., using the antenna 252, RX/TX 254, RX processor 258, TX processor 264, controller processor 280, and/or memory 282) can determine whether overlap exists. The process 1100 may also include adjusting the uplink transmission to address the overlap (block 1104). For example, the UE (e.g., using the antenna 252, RX/TX 254, TX processor 264, controller processor 280, and/or memory 282) can adjust the uplink transmission.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:

determining when a gap between a downlink positioning reference signal (PRS) and a future uplink transmission within a full duplex slot will be less than a predefined minimum gap; and adjusting, responsive to the gap between the downlink PRS and the future uplink transmission being less than the predefined minimum gap, uplink resources of an uplink grant associated with the future uplink transmission to increase a guard band between the downlink PRS and the future uplink transmission such that the gap between the downlink PRS and the future uplink transmission within the full duplex slot is greater than or equal to the predefined minimum gap, the guard band having at least one frequency resource separating the downlink PRS and the future uplink transmission and the future uplink transmission comprising a physical uplink shared channel (PUSCH) transmission, a physical uplink control channel (PUCCH) transmission, or a random access channel (RACH) transmission.

2. The method of claim 1, further comprising:
receiving a radio resource control (RRC) configuration of the guard band; and
increasing at least one of a transmit power or a modulation and coding scheme (MCS) for the future uplink transmission in accordance with the RRC configuration.

3. An apparatus of wireless communications by a user equipment (UE), comprising:
at least one memory;
at least one processor coupled to the at least one memory, the at least one processor being configured to:
determine when a gap between a downlink positioning reference signal (PRS) and a future uplink transmission within a full duplex slot will be less than a predefined minimum gap; and
adjust, responsive to the gap between the downlink PRS and the future uplink transmission being less than the predefined minimum gap, uplink resources of an uplink grant associated with the future uplink transmission to increase a guard band between the downlink PRS and the future uplink transmission such that the gap between the downlink PRS and the future uplink transmission within the full duplex slot is greater than or equal to the predefined minimum gap, the guard band having at least one frequency resource separating the downlink PRS and the future uplink transmission and the future uplink transmission comprising a physical uplink shared channel (PUSCH) transmission, a physical uplink control channel (PUCCH) transmission, or a random access channel (RACH) transmission.

4. The apparatus of claim 3, wherein the at least one processor is further configured to:
receive a radio resource control (RRC) configuration of the guard band; and
increase at least one of a transmit power or a modulation and coding scheme (MCS) for the future uplink transmission in accordance with the RRC configuration.

5. An apparatus of wireless communications by a user equipment (UE), comprising:
means for determining when a gap between a downlink positioning reference signal (PRS) and a future uplink transmission within a full duplex slot will be less than a predefined minimum gap; and
means for adjusting, responsive to the gap between the downlink PRS and the future uplink transmission being less than the predefined minimum gap, uplink resources of an uplink grant associated with the future uplink transmission to increase a guard band between the downlink PRS and the future uplink transmission such that the gap between the downlink PRS and the future uplink transmission within the full duplex slot is greater than or equal to the predefined minimum gap, the guard band having at least one frequency resource separating the downlink PRS and the future uplink transmission and the future uplink transmission comprising a physical uplink shared channel (PUSCH) transmission, a physical uplink control channel (PUCCH) transmission, or a random access channel (RACH) transmission.

6. The apparatus of claim 5, further comprising:
means for receiving a radio resource control (RRC) configuration of the guard band; and
means for increasing at least one of a transmit power or a modulation and coding scheme (MCS) for the future uplink transmission in accordance with the RRC configuration.

* * * * *